United States Patent [19]

Yokoi et al.

[11] Patent Number: 5,327,546

[45] Date of Patent: Jul. 5, 1994

[54] METHOD OF SWITCHING BETWEEN DIFFERENT CONTROL MODES BY MAPPING CORRESPONDING OPERATION STATES WITH RESPECT TO OPERATION TABLES

[75] Inventors: Satoru Yokoi, Kawagoe; Toru Kai, Hanno; Noboru Suzuki, Iruma, all of Japan

[73] Assignee: Tsubakimoto Chain Co., Osaka, Japan

[21] Appl. No.: 856,286

[22] Filed: Mar. 24, 1992

[30] Foreign Application Priority Data

Mar. 25, 1991 [JP] Japan .................................. 3-082954

[51] Int. Cl.⁵ ........................ G06F 9/00; G06F 9/26; G06F 12/00
[52] U.S. Cl. ............................... 395/425; 395/375; 395/400; 364/222; 364/246.3; 364/254.7; 364/DIG. 1
[58] Field of Search ............... 395/800, 375, 425, 400; 364/200, 900

[56] References Cited

U.S. PATENT DOCUMENTS

| | | | |
|---|---|---|---|
| 4,071,911 | 1/1978 | Mazur | 364/130 |
| 4,520,446 | 5/1985 | Sato | 364/468 |
| 4,639,865 | 1/1987 | Martin | 395/375 |
| 4,992,934 | 12/1991 | Portanova et al. | 364/200 |
| 5,111,383 | 5/1992 | Kimura et al. | 364/184 |
| 5,127,096 | 6/1992 | Kaneko et al. | 395/425 |
| 5,140,592 | 8/1992 | Idleman et al. | 371/8.1 |
| 5,198,741 | 3/1993 | Shinada et al. | 318/696 |
| 5,201,039 | 4/1993 | Sakamura | 395/375 |
| 5,247,645 | 9/1993 | Mirza et al. | 395/425 |

OTHER PUBLICATIONS

MacGregor R., "Microprocessor controller by sequential instructions—uses both operating and qualifying codes to access jump table and emulate instruction in succeeding byte", Mar. 24, 1987, PCT GB 87/2203572.

*Primary Examiner*—Alyssa H. Bowler
*Assistant Examiner*—Meng-Ai T. An
*Attorney, Agent, or Firm*—Howson & Howson

[57] ABSTRACT

A method of switching between a sequential control mode and other operation modes by mapping beforehand corresponding operating states with respect to operation tables provided for the different control modes of operation. When an operating state in the sequential control mode, in which a sequential control for plural operation processes on the basis of an SFC (Sequential Function Chart) is performed using programmable sequential controller, is switched to an operating state in a manual control mode or in an inching control mode, the corresponding operating state in the operation table is carried out immediately for the manual or inching mode of operation.

2 Claims, 4 Drawing Sheets

METHOD OF SWITCHING BETWEEN DIFFERENT CONTROL MODES BY MAPPING CORRESPONDING OPERATION STATES WITH RESPECT TO OPERATION TABLES

BRIEF SUMMARY OF THE INVENTION

This invention relates to a method of switching between an automatic sequential control mode and other operation modes.

A sequential control method, also referred to as a relay ladder process, automatically executes a plurality of operations in a process using a programmable sequential controller. Among the many advantages of sequential control is the fact that it allows one operation to be changed to another in the process with great ease. Because of these well-known advantages, sequential control methods have become widely used in manufacturing plants involving various technologies. Due to difficulties in repairing and remodeling these methods, various programmable sequential controllers have been proposed recently which use languages represented in graphic style, such as the programmable sequential controller of a graph set processing type made public in France.

The SFC (Sequential Function Chart) is such a graphic style language represented by three description elements: step, transition, and link. Each step has a corresponding operation circuit, and each transition has a corresponding transition condition circuit. Each has an active logic state and an inactive logic state, the contents of an action corresponding to 1:1 being executed only when the step is in an active state (a condition valid state). A transition defines a transition condition required before executing a shift from a step in an active logic state to an adjacent step in an inactive logic state, the transition condition corresponding to 1:1 being executed only when a step connected as above is in an active state. The result of processing the transition condition is a logic "0" state or a logic "1" state (transition condition valid). The SFC permits a visual representation of a sequence execution order and the contents of processing, and also permits easy monitoring of the state control.

While sequential control methods aim at automatically executing plural operations in sequence, they are not without fault, and accidents may occur unexpectedly. To find a fault requires the operations to be carried out manually or by inching motion. This applies as well to sequential control of plural operations in a process performed by a programmable sequential controller in correspondence to sequential steps in a SFC corresponding to sequential control. If a fault occurs in any one of the operations during performance of the process, the controller switches to the first operation in an inching control mode or a manual control mode thereby making subsequent work more complicated.

Accordingly, the principal object of the invention is to provide a method of switching between a sequential control mode and other control modes in an SFC using correlated operation tables.

In accordance with the invention, a first table stores information of each step in an operating state in a sequential control mode whereby a plurality of operations may be executed by a programmable sequential controller using an SFC; a second table stores information of each step in an operating state in a manual control mode; and a third table stores information in each step in an operating state in an inching control mode. The second and third operation tables each have a memory area for each step containing information corresponding to the information in a memory area of the step in the first operation table for the sequential control mode. When the sequential control mode is switched to either the manual or inching control mode, the step in the second or third table corresponding to the step in the first table is used in the newly selected mode. The tables are prepared in advance, so that changing from an operating state in the sequential control mode of the SFC effects an immediate switch to the corresponding state in the operation table of the new mode.

The foregoing and other objects, features and advantages of the present invention will become apparent when the following description is read in conjunction with the accompanying drawings.

DESCRIPTION OF THE PREFERRED EMBODIMENT

DESCRIPTION OF THE PREFERRED EMBODIMENT

Figure 1:
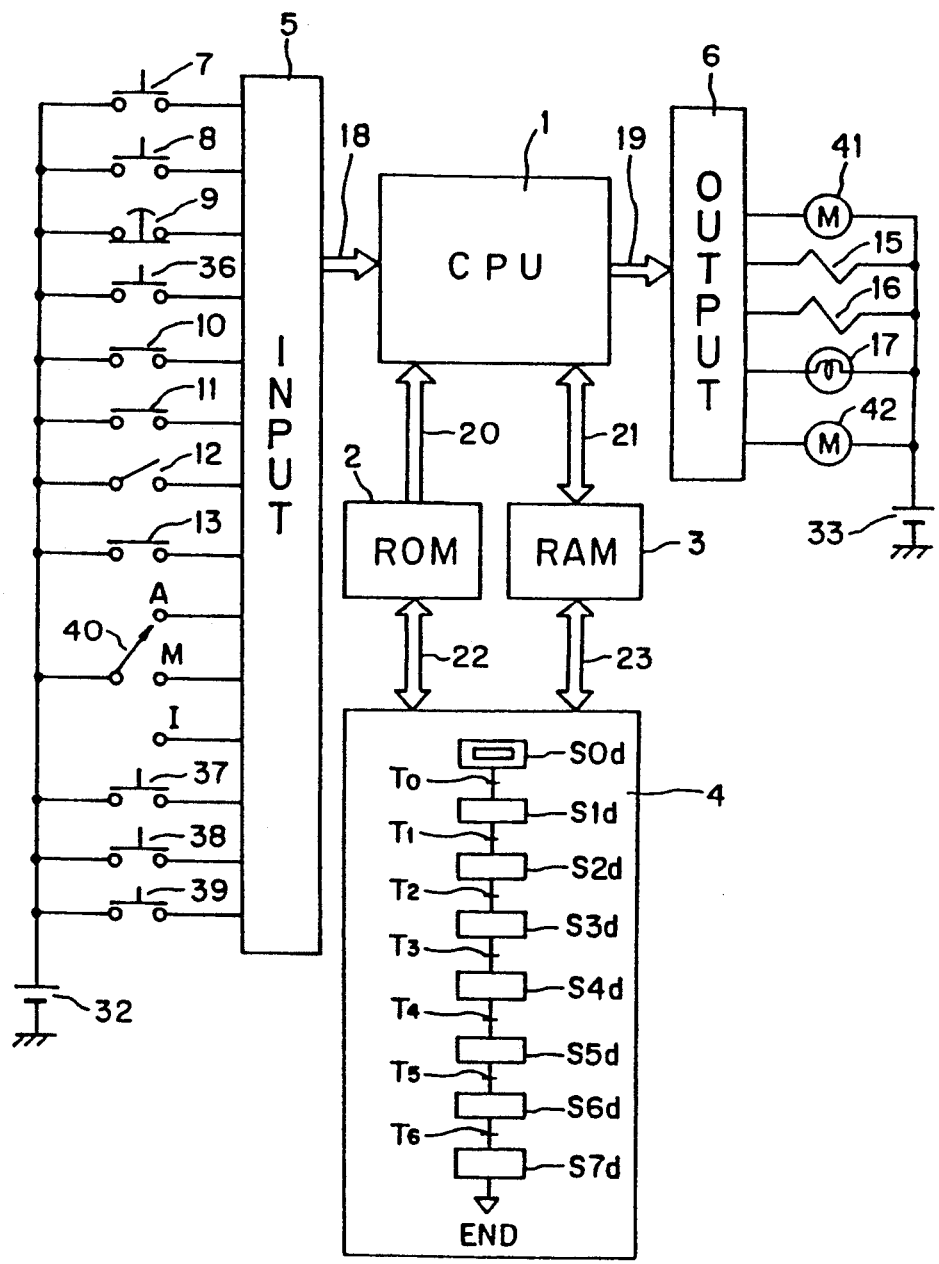
FIG. 1 is a schematic block diagram of a programmable sequential controller carrying out a method of switching between a sequential control mode and other control modes of operation according to the invention.
Figure 2:
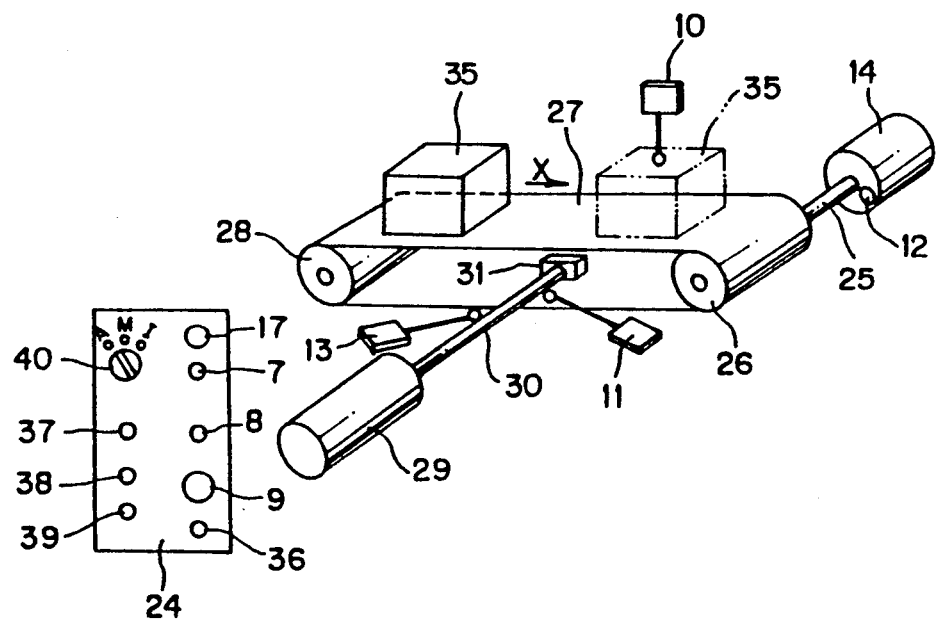
FIG. 2 is a schematic perspective view of a typical automatic product conveyance system to which the method for switching between control modes is applied.

Referring now to the drawings wherein corresponding reference characters denote corresponding parts or steps in the several figures, FIG. 1 illustrates a programmable sequential controller for switching from a sequential control mode of operation to a manual or inching mode of operation in the automatic product conveyance system of FIG. 2. The controller includes a CPU (central processing unit) 1, a ROM (read only memory) 2 in which programs are stored, a RAM (random access memory) 3, and a display 4. ROM 2 is connected to CPU 1 through a signal transmission path 20, and to display 4 through a signal transmission path 22. RAM 3 is connected to CPU 1 and display 4 through signal transmission paths 21 and 23, respectively. The display 4, such as the screen of a CRT (cathode ray tube) a liquid crystal panel or an array of lamps, provides predetermined illuminated patterns from patterns corresponding to operations in an SFC (Sequential Function Chart). In the disclosed embodiment, a CRT is used to display the patterns represented in FIG. 1 by symbols S0d, S1d, ... and $T_0, T_1$ ... etc.

CPU 1 is connected to an input section (interface) 5 through a signal transmission path 18 and to an output section (interface) 6 through a signal transmission path 19. Input signals to section 5 are derived from an electric power source 32 through a start button 7, stop button 8, emergency stop button 9, emergency stop reset button 36, manual start button 37, inching conveyer forward button 38, inching conveyer reverse button 39 and operation mode changing switch 40, all of which are mounted on an operator control panel 24 (FIG. 2). Inputs to section 5 are also provided by limit switches 10, 11, 13 and overload protecting means (thermal switch) 12.

Output section 6 derives electric power from a source 33 through conductor 41 for driving motor M (motor 14 in FIG. 2) at the time of start-up (forward movement) of a conveyor belt 27, through conductors 15 and 16 for operating a pusher motor 29 at the time of forward and backward movements, respectively, through a conductor 42 for driving motor 14 at the time of reverse movement of conveyor belt 27, and through a conductor for energizing lamp 17 to indicate automatic operation.

The sequence of operations which follows for the automatic product conveyance system illustrated in FIG. 2 is merely for purposes of explaining the nature of the invention and is not intended not to be limiting in any manner. When start button 7 on operator control panel 24 is depressed, a predetermined control operation starts. First, lamp 17 turns on indicating the selected mode is in the automatic sequential control mode. Motor 14 starts to rotate in a direction causing conveyer belt 27, stretched between a driving pulley 26 fixed on a rotary shaft 25 of motor 14 and a driven pulley 28, to move in the direction of the arrow X conveying a product 35 to a predetermined position where limit switch 10 stops motor 14. Pusher 29 then moves an actuating piece 31 fixed to the front end of an actuating rod 30 extends toward product 35 discharging it sideways from the belt 27. When piece 31 is fully extended, limit switch 11 causes rod 30 to retract. At limit switch 13, lamp 17 turns off indicating one cycle of automatic operation has been completed.

Figure 3:
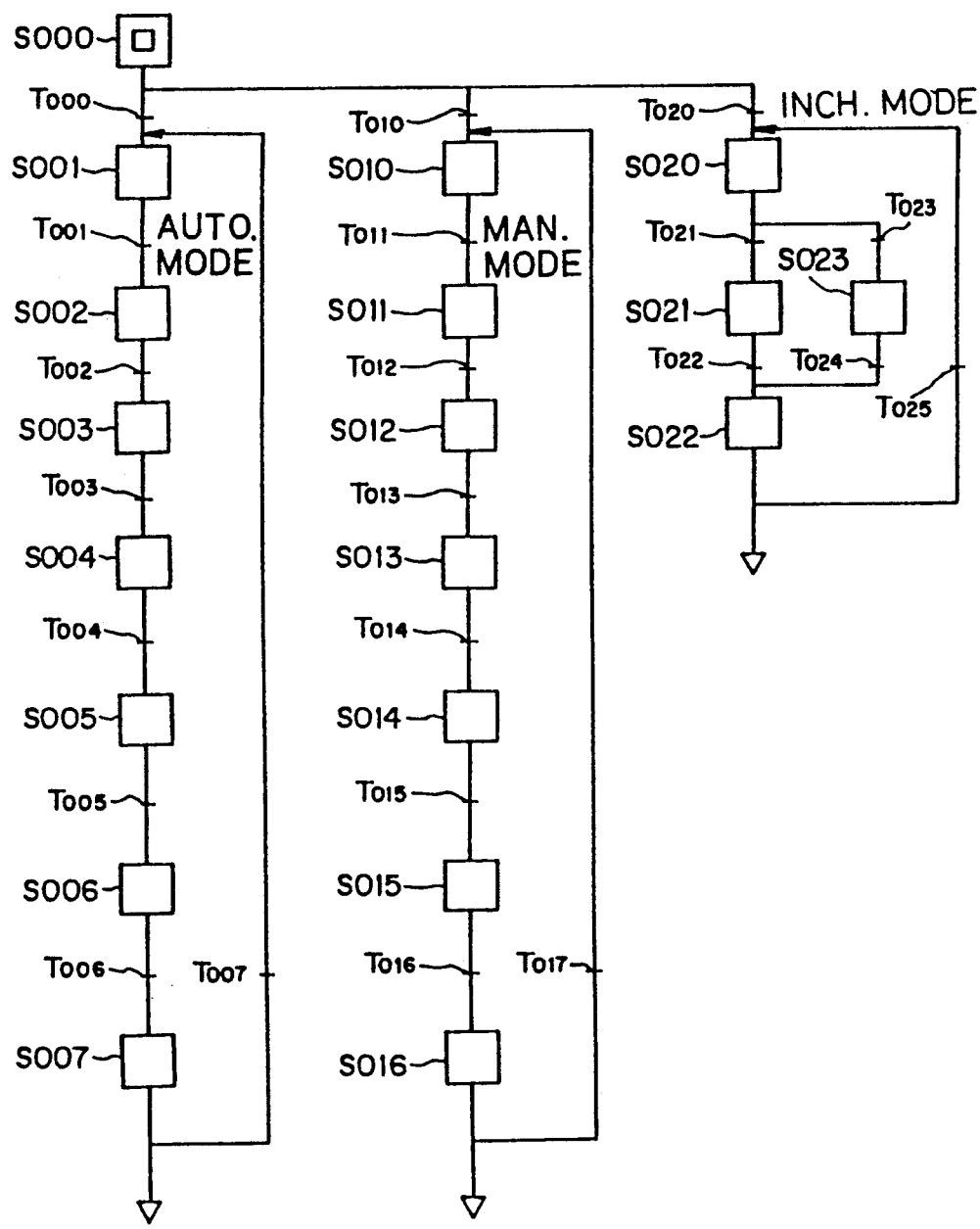
FIG. 3 is a flowchart of the steps in an SFC (Sequential Function Chart) for sequential, manual and inching control modes of operation.

During the above-described cycle, changes in luminance of patterns S0d, S1d . . . appear on display 4 corresponding to steps in the sequential control of the SFC illustrated in FIG. 3 and provide a visual indication of the operating state of each step of the process.

Figure 4:
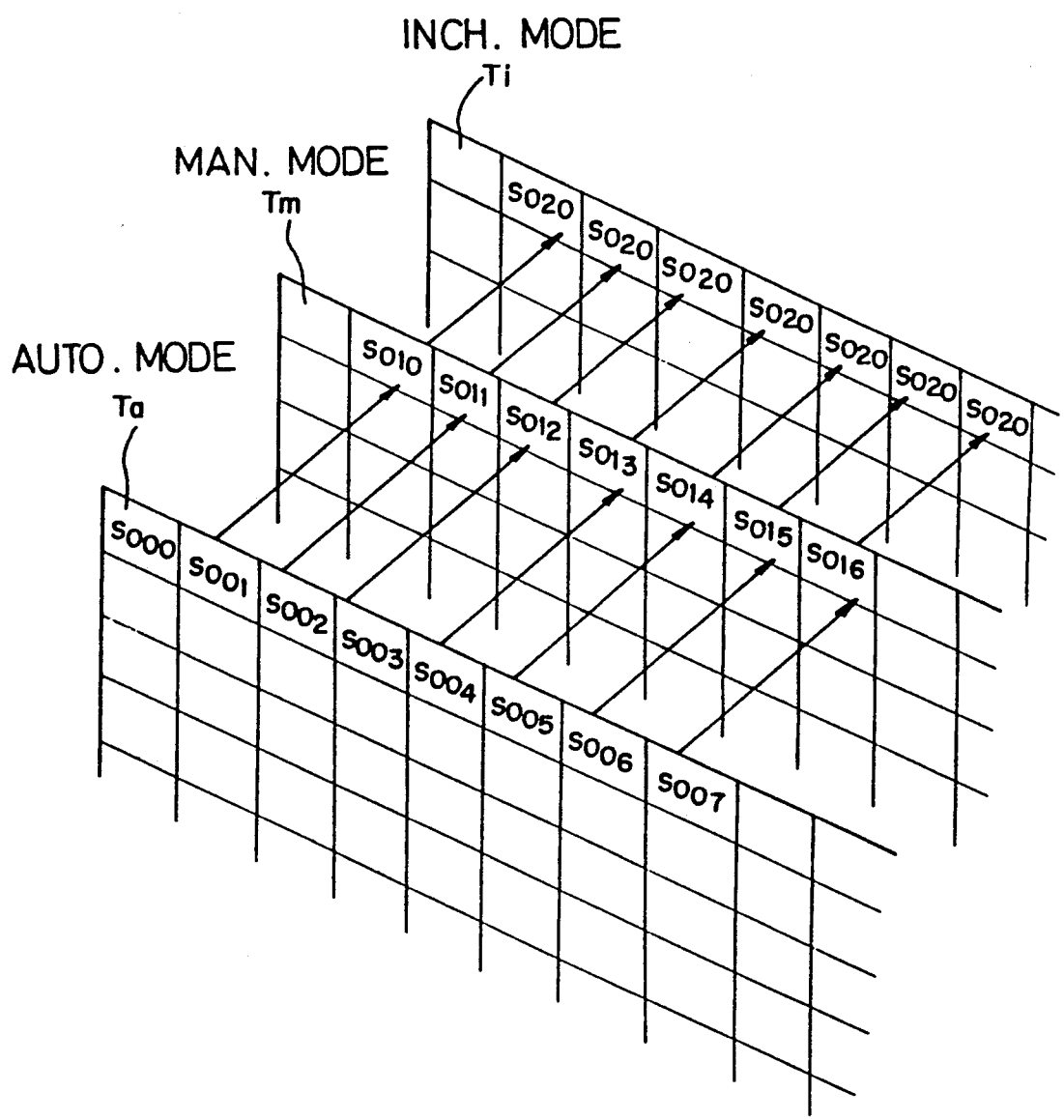
FIG. 4 is an orthographic projection of spartially separated operation tables for correlating the steps in the sequential control mode with the manual and inching control modes of operation.

As shown in FIG. 4, there is a total of twenty-four steps in the three control modes. Steps S001 to S007 in the sequential control mode (auto mode) provide plural operation processes to be performed by the programmable sequential controller on the basis of the SFC. Steps S010 to S016 in the manual control mode are performed manually and correlate with the operations of steps S001 to S007 of the auto mode as follows: S001–S010, S002–S011, S003–S012, S004–S013, S005–S014, S006–S015, S007–S016.

Assuming the sequential control (auto) mode is selected at switch 40 to operate the product conveyance system of FIG. 2 with the sequential controller in accordance with the SFC of FIG. 3, electric power to the system executes step S000 (FIG. 3) and the display patterns S0d in display 4 changes from low (dark) to high (bright) luminance indicating the system is ready. The luminance of patterns S0d, S1d . . . on display 4 changes as the corresponding steps in the SFC advance. The patterns provide a discrete high luminance, a discrete low luminance, and an alternating high and low luminance whereby a step in the operation and a defective pattern are easily discernible.

When the operator depresses start button 7 in a step transition condition circuit of transition T001 (FIG. 3), a signal to CPU 1 from input section 5 causes a shift from step S001 to step S002 according to the program stored in ROM 2. This changes the state of the display patterns corresponding to steps S001 and S002 to predetermined luminances and starts a predetermined control operation for performing sequential steps S001–S007. At the same time, patterns 4 are displayed for each step according to a predetermined state of luminance.

If, emergency stop button 9 and overload protecting means (thermal switch) 12 are both off (i.e. an interlock condition of step S002 is valid) when start button 7 is depressed, the operation circuit of step S002 executes an interlock set instruction and turns lamp 17 on indicating the automatic sequential control mode. In a valid state of the interlock condition of step S002, execution of the interlock instruction continues even with advance of steps in the sequential control mode of the SFC. The operation circuit in step S002 also continues its execution condition and lamp 17 remains on throughout the operation period of the automatic product conveyance system.

If emergency button 9 and overload protecting means (thermal switch) 12 are both off (i.e. the interlock condition of step S003 is off) when the process has advanced from steps S002 to step S003, operation of step S003 starts forward movement of conveyor belt 27 and the corresponding pattern in display 4 changes to a state of predetermined luminance. Product 35 is then conveyed until it actuates limit switch 10 in a predetermined position in the step transition condition circuit of transition T002. This produces a signal through input section 5 to CPU 1 where it is processed in accordance with the program stored in ROM 2 to shift operation from step S003 to step S004. If emergency stop button 9 is off (i.e. the interlock condition of step S004 is off when the shift occurs), CPU 1 causes section 6 to stop motor 14 and stop conveyor belt 27.

When the shift occurs from step S002 to step S003, the interlock condition of step S003 is established by emergency stop button 9 and the overload protecting means (thermal switch) 12 in the operation circuit of step S003. On the other hand, if the shift occurs from step S002 to step S003, while one or both emergency stop button 9 and overload protecting means (thermal switch) 12 in the operation circuit of step S003 are on, (i.e. if the interlock condition of step 003 is not established), the state of the display pattern corresponding to the step in the sequential control mode of the SFC is changed a continuous low luminance to an alternating high and low luminance on a time base. In this state, if the interlock condition of the operation circuit of step S002 exists, the operation circuit of step S002 continues to operate and lamp 17, indicating of automatic operation, remains on.

When the shift occurs from step S002 to step S003, the interlock condition is established if emergency stop button 9 and overload protecting means 12 in the operation circuit of step S003 are both off. On the other hand, if one or both of the emergency stop button 9 and the overload protecting means (thermal switch) 12 are on while the operation circuit of step S003 is operating, the interlock condition is not established. When the shift occurs, the state of the pattern on display 4 corresponding to the step in the SFC changes from the previous continuous low luminance to a continuous high luminance on a time base. However, if one or both of emergency stop button 9 and overload protecting means (thermal switch) 12 are on while the operation circuit of step S003 is operating and the interlock condition is not established, the state of the pattern on display 4 corresponding to step S003 changes from the continuous high luminance to an alternating high and low luminance on a time base.

In the event of a fault in the operation circuit of a step in the sequential control mode of the SFC and the state of the pattern corresponding to that step changes to an alternating high and low luminance on a time base, it is easy and convenient to discern whether the fault is in the operation circuit of the step or in the step transition condition circuit of a transition. In the latter case, a shift in steps does not occur and the display pattern corresponding to a specific step stays in high luminance.

Next, when a shift occurs from step S003 to step S004 and emergency stop button 9 is off (i.e. the interlock condition of step S004 is off), the operation circuit of step S004 stops motor 14 and conveyor belt 27. The display pattern also changes from the previous low luminance to a high luminance.

When the display pattern corresponding to step S004 changes from the low luminance to a high luminance, the operation circuit of step S004 starts a timer. Upon lapse of the time set in the timer, contact of a timer in the step transition condition circuit of transition T004 (a contact of the timer in the operation circuit of step S004) turns on and a shift occurs from step S004 to step S005. The luminant state of each pattern corresponding to steps in the SFC corresponding to the sequential control on display 4 of the programmable sequential controller changes to a predetermined state and the timer value is reset.

When the shift occurs from step S004 to step S005 and emergency stop button 9 in the operation circuit of step S005 is off (i.e. an interlock condition of step S005 is established), the operation circuit of step S005 actuates pusher 29 via supply line 15 from output section 6. Actuating piece 31 on actuating rod 30 then extends forward by and discharges the product 35 from conveyer belt 27. The corresponding display pattern also changes to a predetermined state.

When the actuating piece 31 reaches limit switch 11, the step transition condition circuit of transition T005 provides a signal through input section 5 to CPU 1 where it is processed in accordance with the program stored in ROM 2 to produce a shift from step S005 to step S006.

If emergency stop button 9 in the operation circuit of step S006 is off (i.e. an interlock condition of step S006 is established) when the shift occurs from step S005 to step S006, the operation circuit of step S006 actuates pusher 29 via supply line 16 from the output section 6 causing actuating piece 31 on rod 30 to retract. Also, the corresponding display pattern changes from low to high luminance.

When retraction of actuating piece 31 reaches limit switch 13 the step transition condition circuit of transition T006 provides a signal through input section 5 to CPU 1 where it is processed in accordance with the program stored in ROM 2 and a shift occurs from step S006 to step S007. In step 007, an interlock reset instruction is executed, operation of the operation circuit of step S007 stops, and lamp 17 turns off indicating one cycle of automatic operation has been completed.

The above-described operation takes place while the movable contact of switch 40 is on a fixed contact A for automatically executing a plurality of operation processes sequentially from step S001 to step S007. When the movable contact is switched to a fixed contact M, the manual operation mode of each step, represented by steps S010 to S016, is performed as described above. Manual operation starts by depressing manual start button 37, and proceeds from the operation process of the step where button 37 was depressed to the operation process of the final step. When the series of operations is completed the system turns off. Start button 37 must be depressed again for manual operation to start again. When the movable contact of switch 40 is switched to a fixed contact I, the inching control mode may be performed. Operating conveyor forward button 38 or reverse button 39 on operator control panel 24 inches conveyor belt 27 accordingly.

In the event of a fault or an accident from an unexpected cause during automatic operation of plural operation processes sequentially from step S001 to step S007, the inching mode of operation is selected to find the defective portion, or the manual mode is selected to carry out the operation of each operation process manually. In either case, according to the present invention, an operation process corresponding to the operation process so far performed using the programmable sequential controller can be executed immediately in a different operation mode. This is accomplished using individual operation tables Ta, Tm and Ti such as illustrated in FIG. 4 for the automatic, manual and inching control modes respectively. Each operation state of an operation mode is mapped beforehand to correspond to a like state in the other operation modes. In doing so, switching from the sequential control mode to the manual control mode or to the inching control mode, immediately switches operation from the state being performed to the corresponding state in the operation table for the manual or inching control mode.

For sequential control of plural operation processes on the basis of SFC using the programmable sequential controller, operation tables Ta and Tm are mapped to correlate steps in the sequential control mode (auto mode) with like steps in the manual control mode. The information in each correlated step is stored in corresponding memory areas. Operation table Ti for the inching operation mode is also mapped to correlate like steps with operation tables Ta and Tm. The arrows shown between operation tables Ta, Tm and Ti represent areas which are used in a corresponding relation among those operation tables.

Where a sequential control for plural operation processes is performed on the basis of the SFC using the programmable sequential controller, operation tables Ta, Tm and Ti for plural operation modes is advantageous. When the sequential control mode is switched to another operation mode, CPU 1 insures that the operation process corresponding to the previous operation process can be carried out immediately in accordance with the memory contents of the operation table of the new control mode of operation.

We claim:

1. A method of switching between automatic, manual and inching control modes by an operator using a programmable sequential controller, comprising the steps of: storing in memory locations of the programmable sequential controller a first operation table of operating instructions in the automatic control mode for executing a plurality of processes in accordance with a predetermined sequence; storing, in memory locations of the programmable sequential controller a second operation table of operating instructions in the manual control mode, the memory locations of the instructions in the first and second tables respectively corresponding to each other, storing in memory locations of the controller a third operation table of operating instructions in the inching control mode, the memory locations of the instructions in the first and third tables respectively corresponding to each other; manually switching from one of the control modes to another of the control modes; and using the memory locations of the instructions in the operation table of said other control mode corresponding in memory location to the operating instructions in said one control mode.

2. A method of switching between automatic, manual and inching control modes by an operator using a programmable sequential controller having first, second and third sets of memory areas wherein each memory area of each of the second and third sets has a corresponding memory area in the first set, comprising the steps of: storing, in the memory areas of the first set, a first operation table containing instructions for each step in an operating state in the automatic control mode for executing a plurality of operation processes in accordance with a sequential function chart; storing, in the memory areas of the second set, a second operation table containing instructions for each step in an operating state in the manual control mode; storing, in the memory areas of the third set, a third operation table containing instructions for each step in an operating state in the inching control mode; manually switching from the automatic control mode to a selected one of the manual and inching control modes; and in said selected mode (manual or inching control mode), using the memory area of a corresponding said selected mode, in the set containing instructions for the selected mode, corresponding to the memory area containing the instruction being executed in the automatic control mode at the time of the manual switching.

* * * * *